Dec. 11, 1928.
F. R. OWENS
WINDMILL
Filed Sept. 2, 1927
1,695,154
2 Sheets-Sheet 2
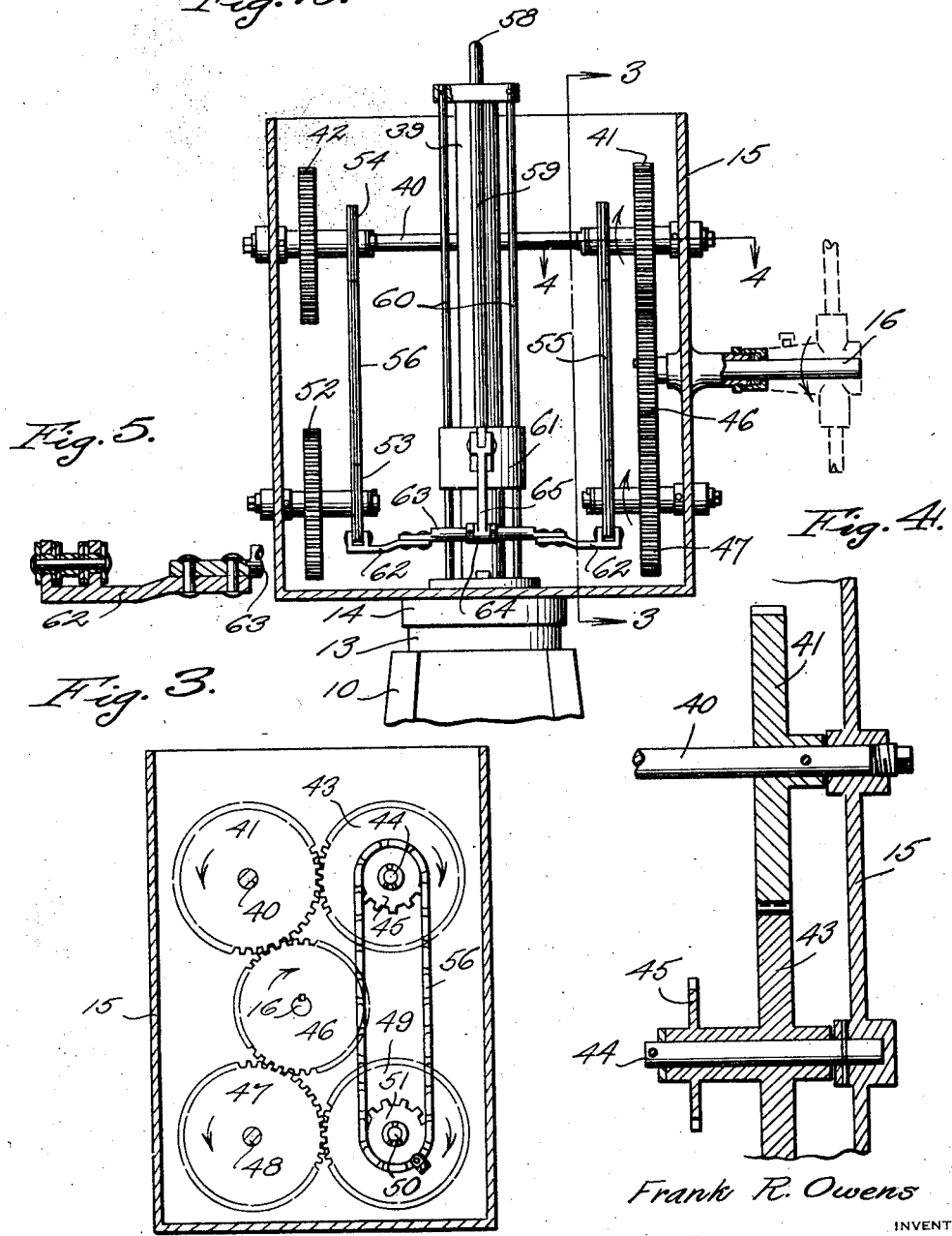

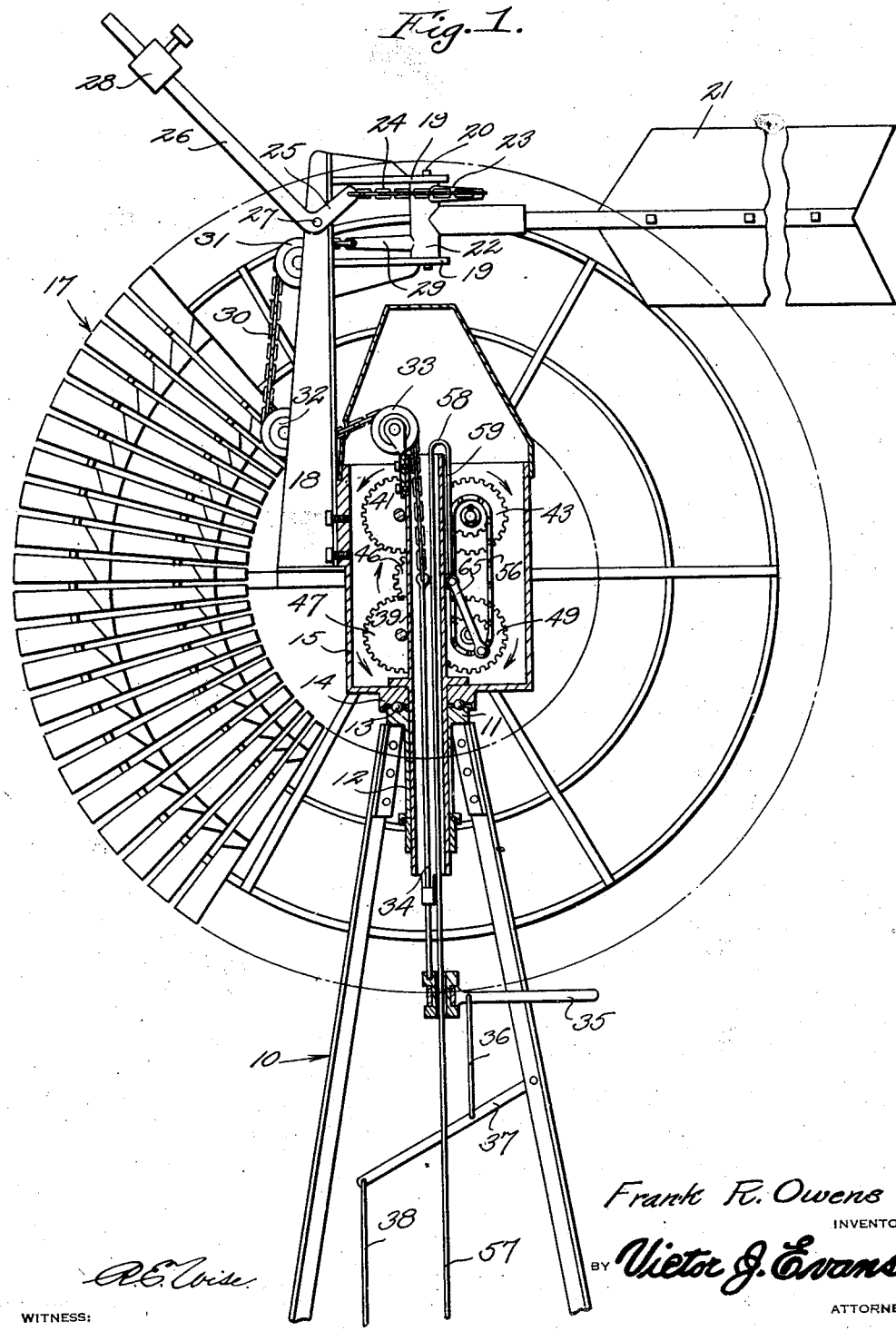

Patented Dec. 11, 1928.

1,695,154

UNITED STATES PATENT OFFICE.

FRANK R. OWENS, OF BEAVER CROSSING, NEBRASKA.

WINDMILL.

Application filed September 2, 1927. Serial No. 217,208.

This invention relates to power apparatus, particularly to windmills, and has for its object the provision of a novel windmill structure embodying means whereby the rotation of the wind wheel itself will be converted into reciprocatory motion for operating a jack shaft or pump rod whereby water may be pumped out of a well, or whereby the power may be utilized for any other desired purpose.
An important object of the invention is to provide a windmill structure in which the transmission mechanism includes a system of gears, sprockets and chains also interconnected and combined as to insure a positive driving action on the pump rod or the like, with but little loss of power.

Yet another object is to provide a windmill transmission structure of this character having a direct connection with the chains and the pump rod, the chain arrangement being so constructed as to permit positive movement and driving action without any possibility of binding or there being any other objectional features.
Still another object is to provide a windmill structure of this character in which use may be made of the wind wheel itself disclosed in my Patent No. 1,581,862, the invention further contemplating provision of means associated with a weather vane for the purpose of throwing the whole mechanism into or out of operation at will.

An additional object is to provide a structure or mechanism of this character which will be comparatively simple and inexpensive to manufacture, easy to install, control, adjust and operate, positive in action, efficient and durable in service, and a general improvement in the art.
To the attainment of the foregoing and other objects and advantages, the invention preferably consists in the details of construction, and the arrangement and combination of parts to be hereinafter more fully described and claimed, and illustrated in the accompanying drawings, in which:

Figure 1 is a view partly in elevation and partly in section disclosing the invention.

Figure 2 is a detail sectional view through the transmission mechanism, the view being taken at right angles to the position disclosed in Figure 1.

Figure 3 is a vertical cross sectional view taken on the line 3—3 of Figure 2.
Figure 4 is a detail horizontal section taken on the line 4—4 of Figure 2, and Figure 5 is a detail sectional view illustrating the connection of the operating member with the sprocket chains.

Referring more particularly to the drawings, the numeral 10 designates a suitable tower at the upper end of which is a platform 11 having a depending sleeve portion 12 and formed with a suitable race in which are ball bearings 13 engaged in turn within a suitable race at the underside of the bottom 14 of a casing 15 through one side of which extends a shaft 16 carrying the wind wheel 17 which may be of any ordinary or preferred type or which may be the same as disclosed in my Patent No. 1,581,862.

Carried by a casing is a bracket structure 18 on which are mounted spaced horizontally extending arms 19 between which is pivoted at 20, the vane 21 which is for the purpose of holding the wheel up into the eye of the wind when desired. The hub portion 22 of the arm carrying the vane is provided with a small crank arm 23 with which is connected a chain or other flexible member 24 connected with one arm 25 of an angle lever 26 which is pivoted at 27 upon the bracket 18 and which carries a counterbalancing weight 28. The hub member or portion of the vane also carries an arm 29 with which is connected one end of a chain or other flexible member 30 which is trained over and about suitable guide pulleys or rollers 31, 32 and 33, the former being mounted on the bracket 18 and the latter within the casing 15. Connected with the other end of the chain is a rod 34 which extends downwardly and which is connected with an intermediate lever 35 in turn connected by a link 36 with a lever 37 pivoted on the tower and having connected therewith a suitable pull rod, rope or other device indicated at 38. In the present instance, no special claim is being made to the arrangement of the vane and the means for swinging it so as to bring the wind wheel into or out of the eye of the wind depending upon whether the operation of the wind mill is desired or not. Located centrally of the casing 15 is a tubular housing 39 which encloses the lower portion of the chain 30 and the upper end of the rod 34. This housing serves an additional function which will be hereinafter explained.

Journaled transversely of the intermediate portion of the casing 15 is a shaft 40 which is horizontally arranged and which is provided near its ends with gears 41 and 42, the former meshing with a gear 43 on a stub shaft 44 which also carries a sprocket 45. The gear 41 meshes with a gear 46 on the end of the wind wheel shaft 16, and this gear 46 in turn meshes with a gear 47 on a shaft 48 located below and probably in vertical alinement with the shaft 40. The gear 47 meshes with a gear 49 on a stub shaft 50 which also carries a sprocket 51. The gear 42 may mesh with any suitable intermediate gears, such as those described above, for driving a gear 52 which carries a sprocket 53. A sprocket 54 is also associated with or constructed upon the hub of the gear 42. Trained about the sprockets 45 and 51 and 53 and 54 are similar chains 55 and 56 which are of course driven at identically the same rate of speed when the wind wheel 17 is in operation.

The mechanism further includes a pump rod 57 which extends within the housing 39 and which is curved back upon itself as shown at 58 to define an end portion 59 located exteriorly of the housing 39. The mechanism further includes guide rods 60 which are suitably mounted and upon which is movable a sleeve 61 connected with the lower end of the end portion 59 of the pump rod. For imparting rectilinear movement to the pump rod, I provide a pair of arms 62 connected with corresponding links of the chains 55 and 56 and also connected with what may be called a cross head 63 on which is rotatable the hub portion 64 of an arm 65 which is pivotally connected with the collar 61 and end of the pump rod.

In the operation of the device, it will be seen that when the wind wheel 17 is rotating, the gear 46 on the shaft thereof will operate to drive the gears 41 and 47 and these will in turn operate to drive the gears 43 and 49 and consequently the shaft 44 and 50 as well as the shafts 40 and 48. The result is that the various sprockets will also be rotated so that the chains 55 and 56 will be moved in exactly a synchronized manner. Owing to the provision of the arms 62 and member 63 connected with the chains and with the pump rod, it is apparent that the pump rod will be moved in a reciprocatory manner, thus fulfilling its function of pumping water or anything else that may be desired.

In view of the fact that all of the shafts are positively driven it is apparent that the power exerted by the sprocket chains will be uniformly applied and that no binding will occur at any time during the pumping operation. Inasmuch as the arm 65 acts in a manner similar to a connecting rod, it is apparent that there will be a free up and down movement of the pump rod in accordance with the travel of the chains, nothing whatsoever being present to interfere with the action. Whenever use of the device is not desired, it is merely necessary to pull upon the member 38 and thereby swing the vane 21 into a position at right angles to the plane of the wind wheel 17 so that the latter will present its edge to the wind instead of its face, thus rendering it inoperative or ineffective for the time being. Certain minor details of construction in regard to the chains are disclosed but it is not believed that a detailed description thereof is particularly necessary especially as the disclosure from a drawing standpoint is so perfectly clear on this point. As a matter of fact it is really believed that the construction, operation and advantages will be readily apparent to one skilled in the art from an inspection of the foregoing description and a study of the drawings, without it being necessary to dwell at any greater length upon the matter.

While I have shown and described the preferred embodiment of the invention, it should be understood that I reserve the right to make such changes in the details of construction, as well as the arrangement and combination of parts as will not depart from the spirit of the invention or the scope of the subjoined claim.

Having thus described the invention, what I claim is:—

In a pumping mechanism, a casing, a driven shaft journaled transversely through said casing, a vertically movable pump rod slidable centrally of said casing, a plurality of shafts journaled transversely of the casing, sprockets on certain of said shafts, chains trained about the corresponding sprockets, gear connections between the driven shaft and said other shafts, and means connecting the chains with the pump rod for operating the latter, comprising arm members connected with corresponding links of the chains, a cross head connected with said arm members, and a connecting rod pivoted upon the cross head and connected with the pump rod, vertically arranged guides within the casing, and a collar slidable along the guides and connected with said connecting rod.

In testimony whereof I affix my signature.

FRANK R. OWENS.